(12) United States Patent
Kim et al.

(10) Patent No.: US 10,243,917 B2
(45) Date of Patent: Mar. 26, 2019

(54) METHOD AND APPARATUS FOR CALCULATING DISTANCE IN CONTENTS DELIVERY NETWORK

(71) Applicant: CDNETWORKS CO., LTD., Seoul (KR)

(72) Inventors: Yong-Bae Kim, Seoul (KR); Seung-Ho Ryu, Seoul (KR); Seok Chan Lee, Seoul (KR)

(73) Assignee: CDNETWORKS CO., LTD., Seoul (KR)

( * ) Notice: Subject to any disclaimer, the term of this patent is extended or adjusted under 35 U.S.C. 154(b) by 650 days.

(21) Appl. No.: 14/783,746

(22) PCT Filed: Feb. 27, 2014

(86) PCT No.: PCT/KR2014/001637
§ 371 (c)(1),
(2) Date: Oct. 9, 2015

(87) PCT Pub. No.: WO2014/168335
PCT Pub. Date: Oct. 16, 2014

(65) Prior Publication Data
US 2016/0087931 A1    Mar. 24, 2016

(30) Foreign Application Priority Data

Apr. 11, 2013 (KR) ........................ 10-2013-0040043

(51) Int. Cl.
*H04L 29/12* (2006.01)
*H04L 29/06* (2006.01)

(52) U.S. Cl.
CPC ...... *H04L 61/1511* (2013.01); *H04L 61/2007* (2013.01); *H04L 67/42* (2013.01)

(58) Field of Classification Search
None
See application file for complete search history.

(56) References Cited

U.S. PATENT DOCUMENTS

2002/0038360 A1    3/2002  Andrews et al.
2002/0059622 A1    5/2002  Grove et al.
(Continued)

OTHER PUBLICATIONS

Krishnan et al. 'Moving Beyond End-to-End Path Information to Optimize CDN Performance', ICM '09, pp. 190-201, Nov. 4, 2009 [retrieved on Nov. 8, 2018]. Retrieved from the Internet: <URL: https://dl.acm.org/citation.cfm?id=1644917>. (Year: 2009).*

(Continued)

*Primary Examiner* — Kevin T Bates
*Assistant Examiner* — Dae Kim
(74) *Attorney, Agent, or Firm* — Fenwick & West LLP

(57) ABSTRACT

Disclosed are a method and an apparatus for calculating a distance in a contents delivery network. According to one preferred embodiment of the present invention, when a domain name resolution request is received from an LDNS, an identifier is added to a domain name requested to be resolved so as to create a CNAMEd domain name response, the CNAMEd domain name response is transmitted to a probe server, the CNAMEd domain name response transmitted to the probe server is transmitted to the LDNS after a source IP address thereof has changed into an address of a name server in the probe server, the name server receives a resolution request to the CNAMEd domain name response from the LDNS, and the name server determines, as a distance between the LDNS and a point of presence (POP), a value obtained by subtracting a distance between the name server and the LDNS and a distance between the name server and the probe server from an interval between a time for transmitting the CNAMEd domain name response from the name server to the probe server and a time for receiving, by the name server, the resolution request to the CNAMEd domain name response from the LDNS. According to the present invention, even when the probe server cannot calculate a distance to the LDNS, a distance between the LDNS (Continued)

and the POP can be calculated, and thus it is possible to improve and stabilize the quality of a contents delivery network service.

24 Claims, 9 Drawing Sheets

(56) References Cited

U.S. PATENT DOCUMENTS

| | | | |
|---|---|---|---|
| 2002/0163882 A1* | 11/2002 | Bornstein | H04L 29/06 |
| | | | 370/227 |
| 2003/0149755 A1 | 8/2003 | Sadot | |
| 2006/0112176 A1* | 5/2006 | Liu | H04L 29/12066 |
| | | | 709/245 |
| 2007/0118668 A1* | 5/2007 | McCarthy | G06F 17/30902 |
| | | | 709/238 |
| 2007/0288639 A1 | 12/2007 | Brown | |
| 2012/0066360 A1* | 3/2012 | Ghosh | H04L 43/0864 |
| | | | 709/223 |
| 2013/0279414 A1* | 10/2013 | Damola | H04L 29/12066 |
| | | | 370/328 |

OTHER PUBLICATIONS

PCT International Search Report, PCT/KR2014/001637, dated May 29, 2014, 6 Pages.

PCT Written Opinion, PCT Application No. PCT/KR2014/001637, dated May 29, 2014, 15 pages.

* cited by examiner

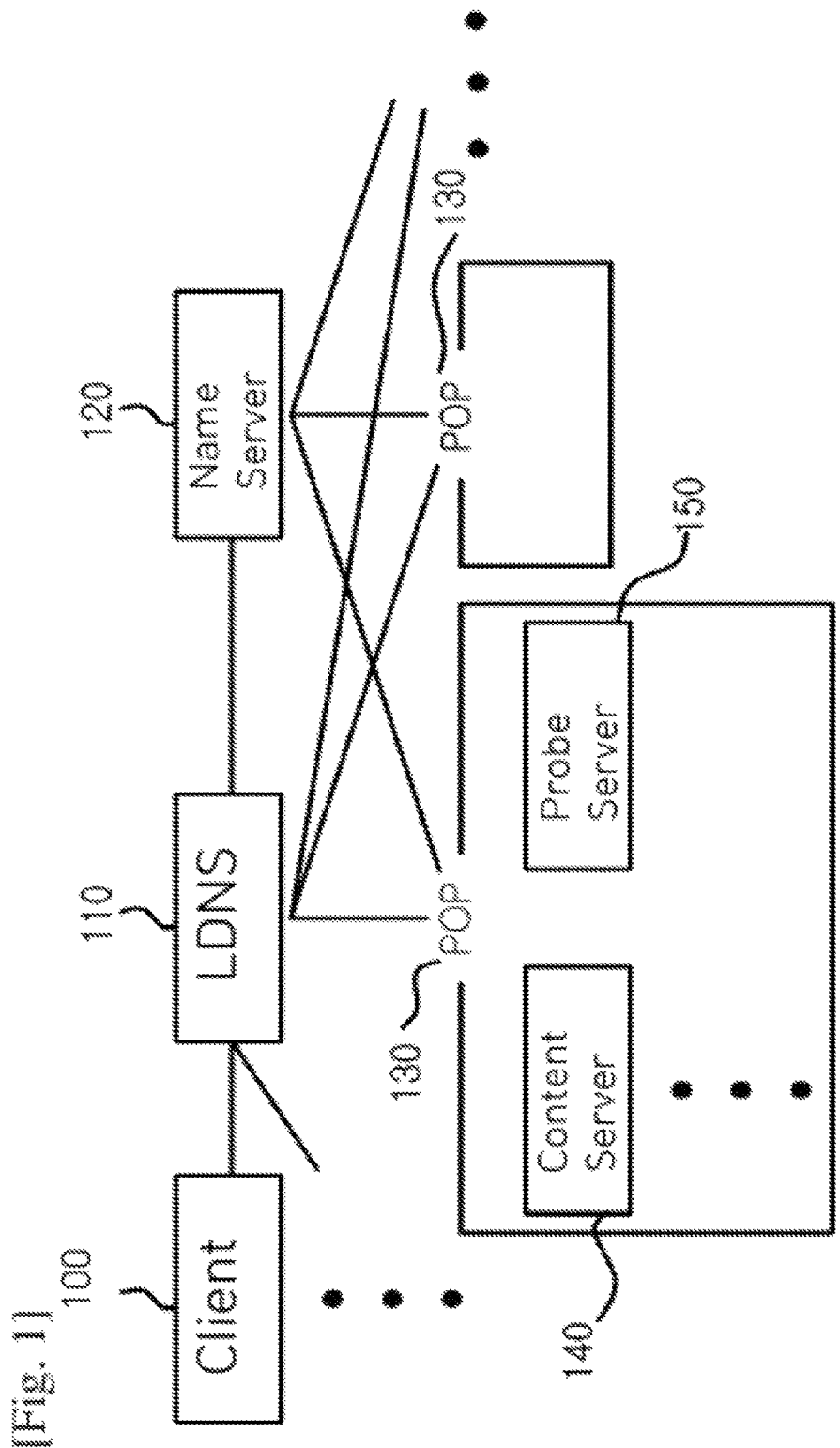

[Fig. 2]
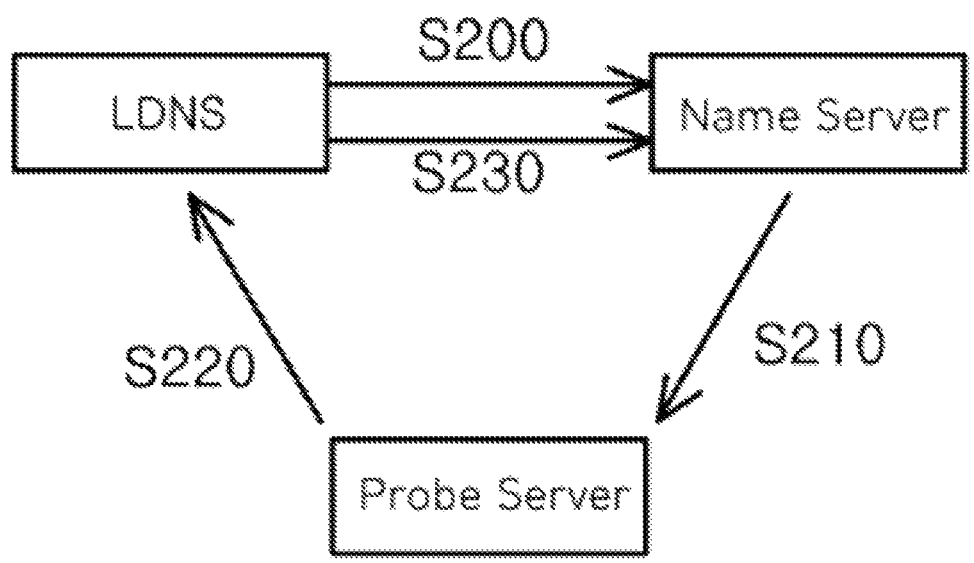

[Fig. 3]
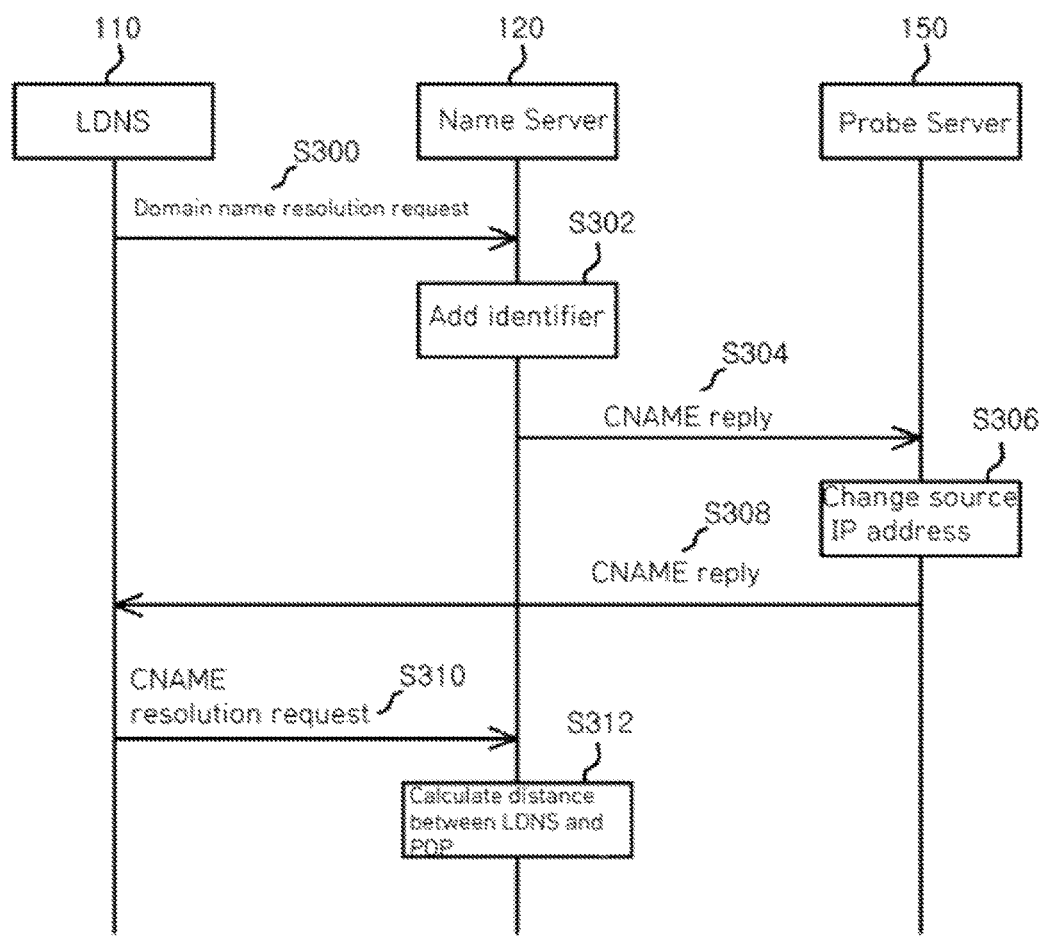

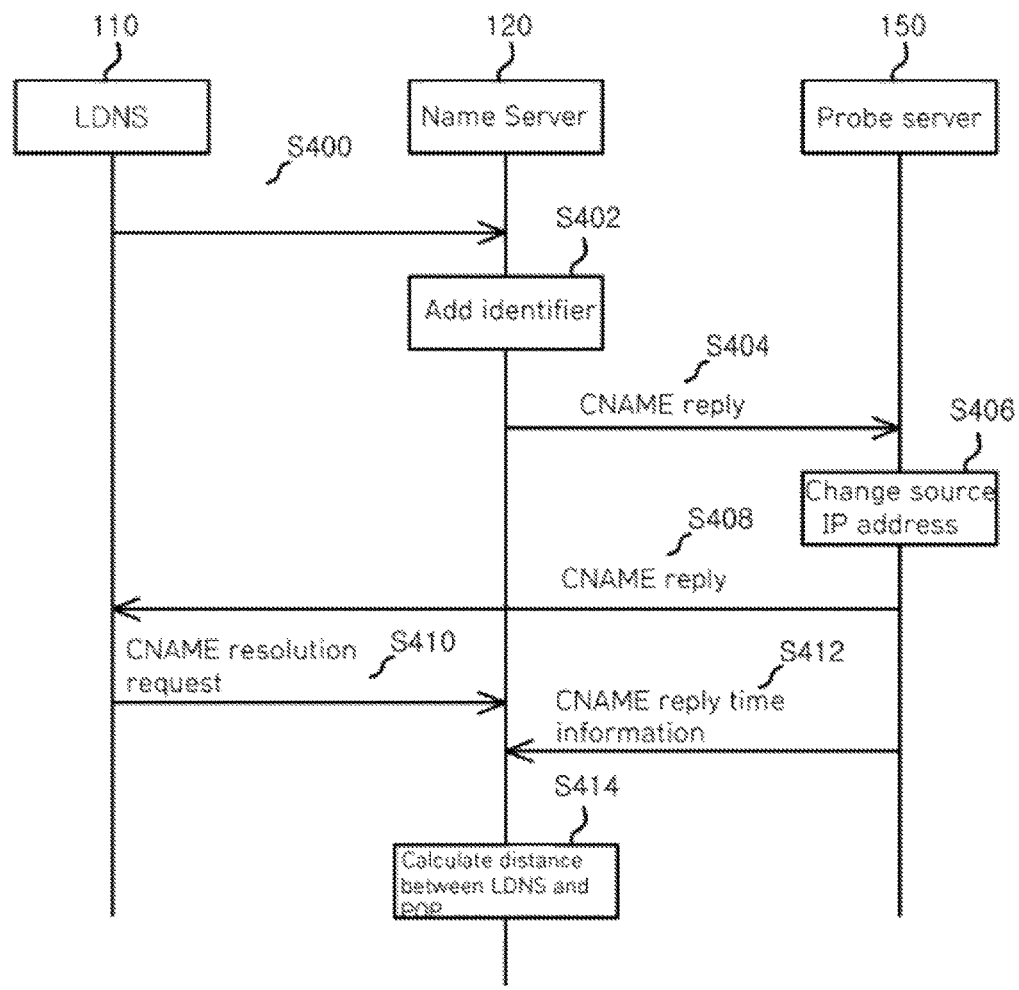
[Fig. 4]

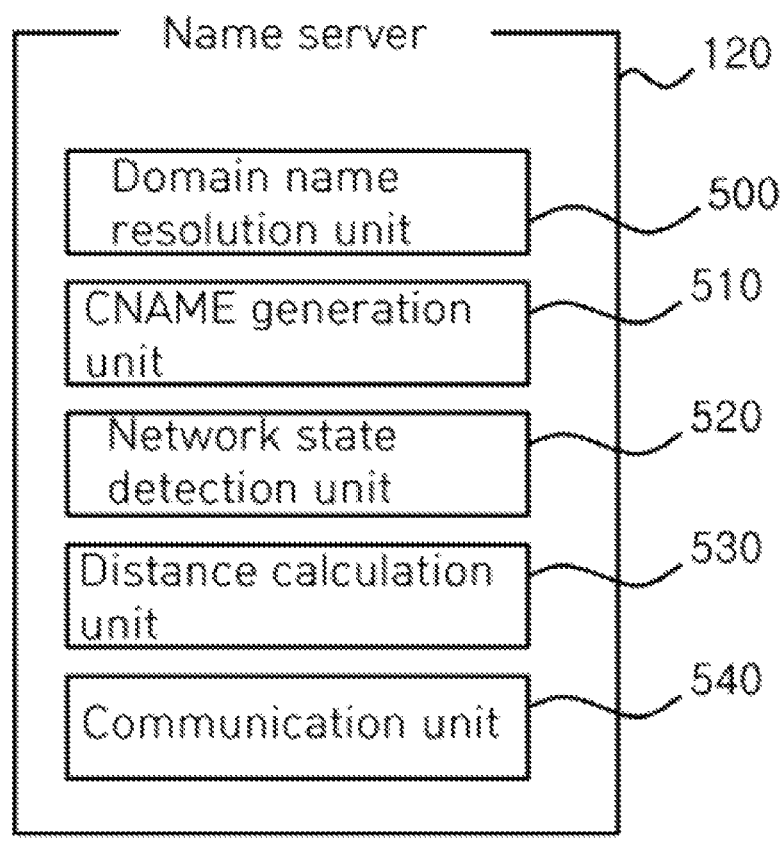
[Fig. 5]

[Fig. 6]
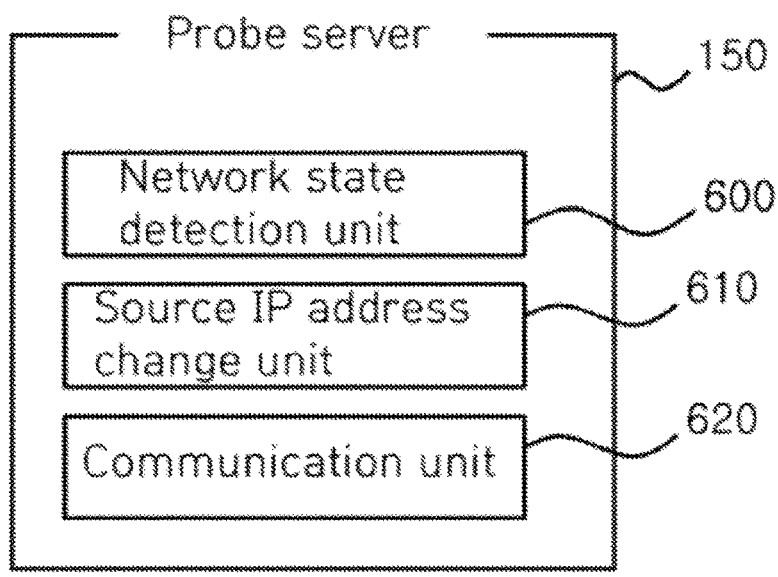

[Fig. 7]
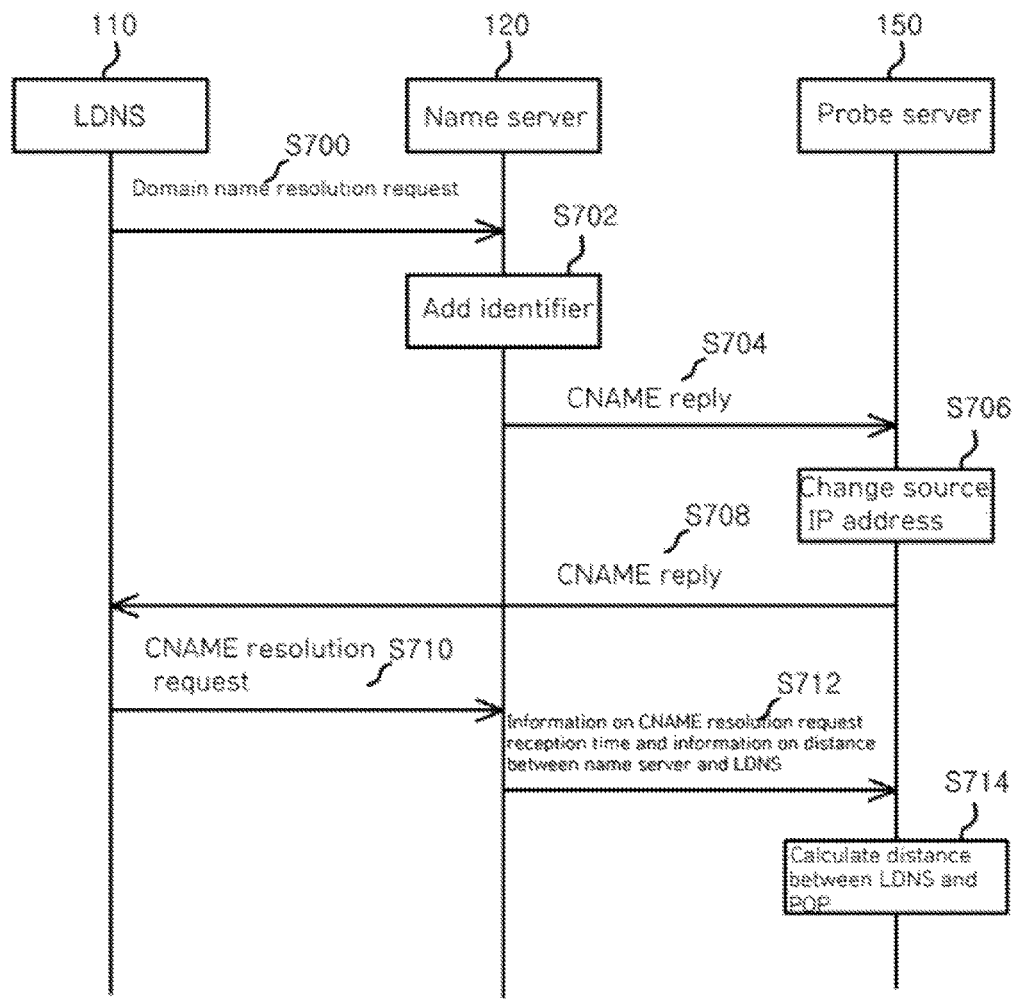

[Fig. 8]
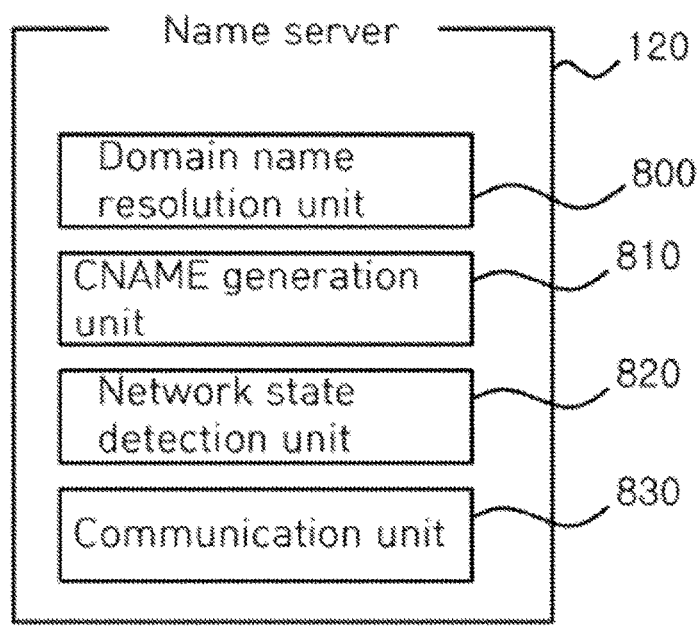

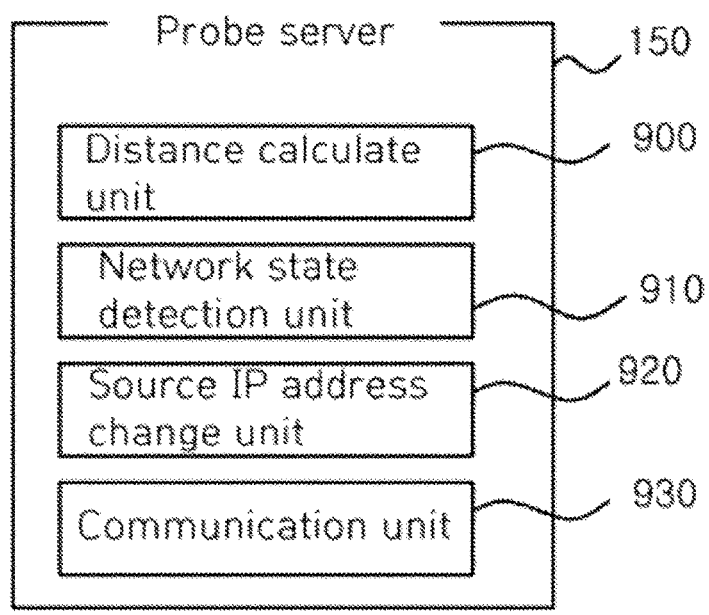
[Fig. 9]

METHOD AND APPARATUS FOR CALCULATING DISTANCE IN CONTENTS DELIVERY NETWORK

TECHNICAL FIELD

The present invention relates to a method and apparatus for calculating a distance in a content delivery network and, more specifically, to a method and apparatus for calculating a distance between a local DNS (LDNS) and a point of presence (POP) in a content delivery network.

BACKGROUND ART

A content delivery network (CDN) service is a service for delivering content stably and rapidly. The CDN service delivers content to a user (client) at the request of the user using a plurality of content providing servers located in a network.

A description will be given of a conventional method for calculating a distance between a local DNS (LDNS) and a point of presence (POP) in the CDN with reference to FIG. 1.

A distance in a network may be a relative concept according to a data transfer rate between nodes which are devices constituting the network, rather than a physical or geographical distance between the nodes.

For example, when it is assumed that node 1 is a device located in Seoul, node 2 is a device located in New York and node 3 is a device located in Tokyo, a geographical distance between node 1 and node 3 is short. However, time required for communication between node 1 and node 2 may be shorter than time required for communication between node 1 and node 3 according to network state, for example, communication line type, performances or types of the corresponding devices. In this case, the distance between node 1 and node 2 can be regarded to be shorter than the distance between node 1 and node 3.

A distance in a network may be referred to as various terms such as RTT (Round Trip Time) and latency.

As shown in FIG. 1, in a CDN, a plurality of clients 100 is linked to an LDNS 110. Upon reception of a DNS resolution request from a client 100, the LDNS 110 delivers a reply to the DNS resolution request to a name server 120.

Here, an Internet protocol (IP) address transmitted by the name server 120 as a response is preferably linked to an optimal POP 130 in the CDN and a content server 140 (edge server or cache server) included in the POP 130.

To this end, the POP 130 includes a probe server 150 for calculating a network distance to the LDNS 110.

That is, the probe server 150 calculates the network distance between the POP 130 and the LDNS 110 using a ping test, trace route or the like and transmits the calculation result to the name server 120 or a load balancer (not shown) which can be separately present such that the name server 120 determines the optimal POP 130 and the content server 140 included in the corresponding POP on the basis of the calculation result.

Accordingly, in determination of the optimal content server 140 for providing content requested by the client 100 in the CDN, it is very important to calculate the distance between the LDNS 110 and the POP 130 in which content severs are present.

However, due to a complicated network configuration and for various reasons such as configurations of devices constituting a network, the probe server 150 may not perform a ping test or trace route for the LDNS 110.

In this case, the probe server 150 cannot calculate the distance between the POP 130 and the LDNS 110 and thus it is difficult to determine the optimal POP 130 or the optimal content server 140 in the CDN.

DISCLOSURE

Technical Problem

The present invention has been made in view of the above problems, and it is an object of the present invention to provide a method and apparatus for calculating a distance in a CDN, which are capable of calculating a distance between an LDNS and a POP even when a probe server cannot calculate the distance between the LDNS and the POP.

Other objects of the present invention will be easily understood through description of the following embodiments.

Technical Solution

The above and other objects can be accomplished by the provision of a method for calculating a distance in a CDN.

In accordance with one aspect of the present invention, a method for calculating, by a name server, a distance between a local DNS (LDNS) and a point of presence (POP) in a content delivery network (CDN) including a client, the LDNS, the name server, the POP, and a probe server included in the POP includes: when a domain name resolution request is received from the LDNS, generating a canonically named (CNAME) domain name reply by adding an identifier to a resolution-requested domain name corresponding to the domain name resolution request; and transmitting the CNAME domain name reply to the probe server, wherein a source IP address corresponding to the CNAME domain name reply transmitted to the probe server is changed to the address of the name server in the probe server and delivered to the LDNS, wherein the name server receives a resolution request for the CNAME domain name reply from the LDNS, wherein the name server calculates the distance between the LDNS and the POP by subtracting a distance between the name server and the LDNS and a distance between the name server and the probe server from an interval between a time when the CNAME domain name reply is transmitted from the name server to the probe server and a time when the name server receives the resolution request for the CNAME domain name reply from the LDNS.

The probe server may be installed in the POP in the form of a program.

The distance between the name server and the LDNS may be calculated through at least one of a ping test and trace route.

The distance between the name server and the LDNS may be calculated using a time for which the name server generates the CNAME domain name reply for the resolution-requested domain name upon receiving the domain name resolution request from the LDNS, transmits the CNAME domain name reply to the LDNS and receives the CNAME resolution request from the LDNS.

The calculating of the distance between the LDNS and the POP may be applied only when the probe server cannot directly calculate the distance between the LDNS and the POP, and the probe server may directly calculate the distance between the LDNS and the POP using at least one of the ping test and trace route.

In accordance with another aspect of the present invention, there is provided a method for calculating, by a name server, a distance between a local DNS and a POP in a CDN including a client, the LDNS, the name server, the POP, and a probe server included in the POP, the method including: when a domain name resolution request is received from the LDNS, generating a CNAME domain name reply by adding an identifier to a resolution-requested domain name corresponding to the domain name resolution request; and transmitting the CNAME domain name reply to the probe server, wherein a source IP address corresponding to the CNAME domain name reply transmitted to the probe server is changed to the address of the name server in the probe server and delivered to the LDNS, wherein the name server receives a resolution request for the CNAME domain name reply from the LDNS, wherein the name server receives information about a time when the CNAME domain name reply is transmitted from the probe server to the LDNS and calculates the distance between the LDNS and the POP by subtracting a distance between the name server and the LDNS from an interval between the time when the CNAME domain name reply is transmitted from the probe server to the LDNS and a time when the name server receives the resolution request for the CNAME domain name reply from the LDNS.

The probe server may be installed in the POP in the form of a program.

The distance between the name server and the LDNS may be calculated through at least one of a ping test and trace route.

The distance between the name server and the LDNS may be calculated using a time for which the name server generates the CNAME domain name reply for the resolution-requested domain name upon receiving the domain name resolution request from the LDNS, transmits the CNAME domain name reply to the LDNS and receives the CNAME resolution request from the LDNS.

The name server and the probe server may be synchronized with each other.

The calculating of the distance between the LDNS and the POP may be applied only when the probe server cannot directly calculate the distance between the LDNS and the POP, and the probe server may directly calculate the distance between the LDNS and the POP using at least one of the ping test and trace route.

In accordance with another aspect of the present invention, there is provided a method for calculating, by a probe server, a distance between a local DNS and a POP in a CDN including a client, the LDNS, a name server, the POP, and the probe server included in the POP, the method including: receiving, from the name server, a CNAME domain name reply generated by receiving a domain name resolution request from the LDNS and adding an identifier to a resolution-requested domain name corresponding to the domain name resolution request; changing a source IP address corresponding to the received CNAME domain name reply to the address of the name server and transmitting the address of the name server to the LDNS; receiving, from the name server, information about a time when the name server receives a resolution request for the CNAME domain name reply from the LDNS and information about a distance between the name server and the LDNS; and calculating the distance between the LDNS and the POP by subtracting the distance between the name server and the LDNS from an interval between a time when the CNAME domain name reply is transmitted to the LDNS and a time when the resolution request for the CNAME domain name reply from the LDNS is received from the name server.

The probe server may be installed in the POP in the form of a program.

The distance between the name server and the LDNS may be calculated through at least one of a ping test and trace route.

The distance between the name server and the LDNS may be calculated using a time for which the name server generates the CNAME domain name reply for the resolution-requested domain name upon receiving the domain name resolution request from the LDNS, transmits the CNAME domain name reply to the LDNS and receives the CNAME resolution request from the LDNS.

The name server and the probe server may be synchronized with each other.

The calculating of the distance between the LDNS and the POP may be applied only when the probe server cannot directly calculate the distance between the LDNS and the POP, and the probe server may directly calculate the distance between the LDNS and the POP using at least one of the ping test and trace route.

A distance calculation unit of the name server may calculate the distance between the LDNS and the POP only when the probe server cannot directly calculate the distance between the LDNS and the POP.

According to another aspect of the present invention, an apparatus for calculating a distance in a CDN is provided.

In accordance with another aspect of the present invention, there is provided an apparatus for calculating a distance between an LDNS and a POP in a CDN including a client, the LDNS, a name server, the POP, and a probe server included in the POP, the name server as the apparatus including: a domain name resolution unit for transmitting, to the LDNS, an IP address matched to a domain name corresponding to a domain name resolution request when the domain name resolution request is received from the LDNS; a CNAME generation unit for generating a CNAME domain name reply by adding an identifier to the resolution-requested domain name; a network state detection unit for calculating a distance between the LDNS and the name server; a distance calculation unit for calculating the distance between the LDNS and the POP; and a communication unit for receiving the domain name resolution request from the LDNS, transmitting the CNAME domain name reply to the probe server and receiving a domain name resolution request from the LDNS, wherein a source IP address corresponding to the CNAME domain name reply transmitted to the probe server through the communication unit is changed to the address of the name server in the probe server and delivered to the LDNS, wherein a resolution request for the CNAME domain name reply is received from the LDNS through the communication unit, wherein the distance calculation unit calculates the distance between the LDNS and the POP by subtracting a distance between the name server and the LDNS and a distance between the name server and the probe server from an interval between a time when the CNAME domain name reply is transmitted from the name server to the probe server and a time when the name server receives the resolution request for the CNAME domain name reply from the LDNS.

The probe server may be installed in the POP in the form of a program.

The network state detection unit may calculate the distance between the name server and the LDNS through at least one of a ping test and trace route.

The network state detection unit may calculate the distance between the name server and the LDNS using a time for which the name server generates the CNAME domain name reply for the resolution-requested domain name when receiving the domain name resolution request from the LDNS, transmits the CNAME domain name reply to the LDNS and receives the CNAME resolution request from the LDNS.

The name server and the probe server may be synchronized with each other.

The distance calculation unit of the name server may calculate the distance between the LDNS and the POP only when the probe server cannot directly calculate the distance between the LDNS and the POP, and the probe server may directly calculate the distance between the LDNS and the POP using at least one of a ping test and trace route.

In accordance with another aspect of the present invention, there is provided an apparatus for calculating a distance between an LDNS and a POP in a CDN including a client, the LDNS, a name server, the POP, and a probe server included in the POP, the name server as the apparatus including: a domain name resolution unit for transmitting, to the LDNS, an IP address matched to a domain name corresponding to a domain name resolution request when the domain name resolution request is received from the LDNS; a CNAME generation unit for generating a CNAME domain name reply by adding an identifier to the resolution-requested domain name; a network state detection unit for calculating a distance between the LDNS and the name server; a distance calculation unit for calculating the distance between the LDNS and the POP; and a communication unit for receiving the domain name resolution request from the LDNS, transmitting the CNAME domain name reply to the probe server and receiving a domain name resolution request from the LDNS, wherein a source IP address corresponding to the CNAME domain name reply transmitted to the probe server through the communication unit is changed to the address of the name server in the probe server and delivered to the LDNS, wherein a resolution request for the CNAME domain name reply is received from the LDNS through the communication unit, and information about a time when the CNAME domain name reply is transmitted from the probe server to the LDNS is received, wherein the distance calculation unit calculates the distance between the LDNS and the POP by subtracting a distance between the name server and the LDNS from an interval between the time when the CNAME domain name reply is transmitted from the probe server to the LDNS and a time when the name server receives the resolution request for the CNAME domain name reply from the LDNS.

The probe server may be installed in the POP in the form of a program.

The network state detection unit may calculate the distance between the name server and the LDNS through at least one of a ping test and trace route.

The network state detection unit may calculate the distance between the name server and the LDNS using a time for which the name server generates the CNAME domain name reply for the resolution-requested domain name when receiving the domain name resolution request from the LDNS, transmits the CNAME domain name reply to the LDNS and receives the CNAME resolution request from the LDNS.

The distance calculation unit of the name server may calculate the distance between the LDNS and the POP only when the probe server cannot directly calculate the distance between the LDNS and the POP, and the probe server may directly calculate the distance between the LDNS and the POP using at least one of a ping test and trace route.

In accordance with another aspect of the present invention, there is provided an apparatus for calculating a distance between an LDNS and a POP in a CDN including a client, the LDNS, a name server, the POP, and a probe server included in the POP, the probe server as the apparatus including: a network state detection unit for calculating a distance between the probe server and the name server; a source IP address change unit for changing a source IP address to the IP address of the name server when a CNAME domain name reply received from the name server is delivered to the LDNS, wherein the CNAME domain name reply received from the name server is generated by the name server by receiving a domain name resolution request from the LDNS and adding an identifier to a resolution-requested domain name corresponding to the domain name resolution request; a distance calculation unit for calculating the distance between the LDNS and the POP; and a communication unit for receiving a resolution request for the CNAME domain name reply from the name server, transmitting, to the LDNS, the CNAME domain name reply, for which the source IP address is changed by the source IP address change unit, and receiving, from the name server, information about a time when the resolution request for the CNAME domain name reply is received from the LDNS and information about a distance between the name server and the LDNS, wherein the distance calculation unit calculates the distance between the LDNS and the POP by subtracting the distance between the name server and the LDNS from an interval between a time when the CNAME domain name reply is transmitted to the LDNS and a time when the resolution request for the CNAME domain name reply from the LDNS is received from the name server.

The probe server may be installed in the POP in the form of a program.

The information about the distance between the name server and the LDNS, received by the name server, may be information calculated by the name server using at least one of a ping test and trace route.

The information about the distance between the name server and the LDNS, received by the name server, may be information calculated using a time for which the name server generates the CNAME domain name reply indicating that the resolution-requested domain name has been canonically named when receiving the domain name resolution request from the LDNS, transmits the CNAME domain mane reply to the LDNS and receives the CNAME resolution request from the LDNS.

The name server and the probe server may be synchronized with each other.

The distance calculation unit of the probe server may calculate the distance between the LDNS and the POP only when the probe server cannot directly calculate the distance between the LDNS and the POP, and the probe server may directly calculate the distance between the LDNS and the POP using at least one of a ping test and trace route.

According to another aspect of the present invention, a recording medium storing a program for implementing a method for calculating a distance in a CDN is provided.

In accordance with another aspect of the present invention, there is provided a recording medium storing a program for implementing a method for calculating, by a name server, a distance between an LDNS and a POP in a CDN including a client, the LDNS, the name server, the POP, and a probe server included in the POP, the method including: when a domain name resolution request is received from the LDNS, generating a canonically named (CNAME) domain name reply by adding an identifier to a resolution-requested domain name corresponding to the domain name resolution request; and transmitting the CNAME domain name reply to the probe server, wherein a source IP address corresponding to the CNAME domain name reply transmitted to the probe server is changed to the address of the name server in the probe server and delivered to the LDNS, wherein the name server receives a resolution request for the CNAME domain name reply from the LDNS, wherein the name server calculates the distance between the LDNS and the POP by subtracting a distance between the name server and the LDNS and a distance between the name server and the probe server from an interval between a time when the CNAME domain name reply is transmitted from the name server to the probe server and a time when the name server receives the resolution request for the CNAME domain name reply from the LDNS.

The probe server may be installed in the POP in the form of a program.

The distance between the name server and the LDNS may be calculated through at least one of a ping test and trace route.

The distance between the name server and the LDNS may be calculated using a time for which the name server generates the CNAME domain name reply for the resolution-requested domain name upon receiving the domain name resolution request from the LDNS, transmits the CNAME domain name reply to the LDNS and receives the CNAME resolution request from the LDNS.

The calculating of the distance between the LDNS and the POP may be applied only when the probe server cannot directly calculate the distance between the LDNS and the POP, and the probe server may directly calculate the distance between the LDNS and the POP using at least one of the ping test and trace route.

In accordance with another aspect of the present invention, there is provided a recording medium storing a program for implementing a method for calculating, by a name server, a distance between a local DNS and a POP in a CDN including a client, the LDNS, the name server, the POP, and a probe server included in the POP, the method including: when a domain name resolution request is received from the LDNS, generating a CNAME domain name reply by adding an identifier to a resolution-requested domain name corresponding to the domain name resolution request; and transmitting the CNAME domain name reply to the probe server, wherein a source IP address corresponding to the CNAME domain name reply transmitted to the probe server is changed to the address of the name server in the probe server and delivered to the LDNS, wherein the name server receives a resolution request for the CNAME domain name reply from the LDNS, wherein the name server receives information about a time when the CNAME domain name reply is transmitted from the probe server to the LDNS and calculates the distance between the LDNS and the POP by subtracting a distance between the name server and the LDNS from an interval between the time when the CNAME domain name reply is transmitted from the probe server to the LDNS and a time when the name server receives the resolution request for the CNAME domain name reply from the LDNS.

The probe server may be installed in the POP in the form of a program.

The distance between the name server and the LDNS may be calculated through at least one of a ping test and trace route.

The distance between the name server and the LDNS may be calculated using a time for which the name server generates the CNAME domain name reply for the resolution-requested domain name upon receiving the domain name resolution request from the LDNS, transmits the CNAME domain name reply to the LDNS and receives the CNAME resolution request from the LDNS.

The name server and the probe server may be synchronized with each other.

The calculating of the distance between the LDNS and the POP may be applied only when the probe server cannot directly calculate the distance between the LDNS and the POP, and the probe server may directly calculate the distance between the LDNS and the POP using at least one of the ping test and trace route.

In accordance with another aspect of the present invention, there is provided a recording medium storing a program for implementing a method for calculating, by a probe server, a distance between a local DNS and a POP in a CDN including a client, the LDNS, a name server, the POP, and the probe server included in the POP, the method including: receiving, from the name server, a CNAME domain name reply generated by receiving a domain name resolution request from the LDNS and adding an identifier to a resolution-requested domain name corresponding to the domain name resolution request; changing a source IP address corresponding to the received CNAME domain name reply to the address of the name server and transmitting the address of the name server to the LDNS; receiving, from the name server, information about a time when the name server receives a resolution request for the CNAME domain name reply from the LDNS and information about a distance between the name server and the LDNS; and calculating the distance between the LDNS and the POP by subtracting the distance between the name server and the LDNS from an interval between a time when the CNAME domain name reply is transmitted to the LDNS and a time when the resolution request for the CNAME domain name reply from the LDNS is received from the name server.

The probe server may be installed in the POP in the form of a program.

The distance between the name server and the LDNS may be calculated through at least one of a ping test and trace route.

The distance between the name server and the LDNS may be calculated using a time for which the name server generates the CNAME domain name reply for the resolution-requested domain name upon receiving the domain name resolution request from the LDNS, transmits the CNAME domain name reply to the LDNS and receives the CNAME resolution request from the LDNS.

The name server and the probe server may be synchronized with each other.

The calculating of the distance between the LDNS and the POP may be applied only when the probe server cannot directly calculate the distance between the LDNS and the POP, and the probe server may directly calculate the distance between the LDNS and the POP using at least one of the ping test and trace route.

Advantageous Effects

As described above, according to the method and apparatus for calculating a distance in a CDN according to the present invention, a distance between an LDNS and a POP can be calculated even when the probe server cannot calculate the distance.

Accordingly, it is possible to improve CDN service quality and to stabilize the CDN service.

DESCRIPTION OF DRAWINGS

FIG. 1 illustrates a configuration of a CDN to which the present invention is applied.

FIG. 2 illustrates a procedure for implementing a method for calculating a distance between an LDNS and a POP according to a preferred embodiment of the present invention.

FIG. 3 is a flowchart illustrating a method for calculating a distance between an LDNS and a POP according to a first embodiment of the present invention.

FIG. 4 is a flowchart illustrating a method for calculating a distance between an LDNS and a POP according to a second embodiment of the present invention.

FIG. 5 illustrates a configuration of a name server according to the first and second embodiments of the present invention.

FIG. 6 illustrates a configuration of a probe server according to the first and second embodiments of the present invention.

FIG. 7 is a flowchart illustrating a method for calculating a distance between an LDNS and a POP according to a third embodiment of the present invention.

FIG. 8 illustrates a configuration of a name server according to the third embodiment of the present invention.

FIG. 9 illustrates a configuration of a probe server according to the third embodiment of the present invention.

BEST MODE

The present invention may, however, be embodied in many alternate forms and should not be construed as limited to the embodiments set forth herein. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The same reference numbers will be used throughout this specification to refer to the same or like parts. In the following description of the present invention, a detailed description of known functions and configurations incorporated herein will be omitted when it may obscure the subject matter of the present invention.

It will be understood that, although the terms first, second, etc. may be used herein to describe various elements, these elements should not be limited by these terms. These terms are only used to distinguish one element from another element.

For example, a first element could be termed a second element, and similarly, a second element may be termed a first element without departing from the teachings of the present invention.

It will also be understood that the term "and/or" as used herein refers to and encompasses any and all possible combinations of one or more of the associated listed items.

It will be understood that when an element is referred to as being "connected to" another element, the element can be connected to the other element or intervening elements may also be present.

In contrast, when an element is referred to as being "directly connected to" another element, there are no intervening elements present.

The terms used in the specification are used to describe a specific embodiment and do not limit the present invention.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Unless otherwise defined, all terms (including technical and scientific terms) used herein have the same meaning as commonly understood by one of ordinary skill in the art to which this invention pertains.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference will now be made in detail to the preferred embodiments of the present invention, examples of which are illustrated in the accompanying drawings. In addition, wherever possible, the same reference numbers will be used throughout the drawings to refer to the same or like parts, and a repeated description thereof will be omitted.

A description will be given of a configuration of a content delivery network (CDN) to which the present invention is applicable with reference to FIG. 1.

Clients 100 are terminal devices which request content delivery and may include a user computer, a wireless terminal and the like.

An LDNS 110, which is a local domain name server or system, receives a DNS resolution request for a site or content that a client 100 wants to access or request and delivers a DNS reply received from a name server 120 to the client 100.

The DNS resolution request received by the LDNS 110 is generally composed of characters and the like and the DNS reply delivered from the LDNS 110 to the client 100 is generally an IP address composed of figures.

The name server 120 may be called a domain name service server, a domain name system server, a domain name server or the like and delivers an IP address matched to a domain corresponding to the DNS resolution request to the LDNS 110 upon reception of the DNS resolution request from the LDNS 110.

In a case that a plurality of content servers 140 is present when the name server 120 determines an IP address matched to a domain, various methods for determining an optimal content server 140 capable of providing content more rapidly and correctly are applied. A typical method is load balancing.

A separate server or device which performs load balancing is referred to as a load balancer, and the load balancer may be included in the name server 120 or implemented as a separate device.

A point of presence (POP) 130 generally indicates the location of an Internet access point.

While the POP 130 may refer to a specific point or a specific device, multiple servers including content servers 140 are connected in the POP 130 and thus the POP 130 may be recognized as a group including a plurality of devices or servers such as the content servers 140.

The POP 130 in the CDN can include at least one content server 140 which transmits content to the client 100 and a probe server 150 having a function of detecting a network state.

The content server 140 included in the POP 130 in the CDN may be called an edge server or a cache server.

The probe server 150 can execute various functions in order to detect a network state. In the CDN, a major function of the probe server 150 is to detect a network state between the POIP 130 and the LDNS 110, particularly, to calculate a network distance.

Such probe server 150 is also called a probe agent, an agent or the like and may be present as a separate server or device in the POP 130, that is, connected to the POP 130, in order to detect a network state.

When the POP 130 refers to a specific device as a point, as described above, the probe server 150 may be installed in the POP 130 so as to detect a network state. However, the following description is based on a case in which the probe server 150 is configured as a separate device for convenience of description and the present invention will be described on the assumption that calculation of a distance between the LDNS 110 and the probe server 150 corresponds to calculation of a distance between the LDNS 110 and the POP 130.

The probe server 150 calculates the distance between the POP 130 and the LDNS 110 through a method such as a ping test or trace route in a prior art, as described above.

However, calculation of the distance between the POP 130 and the LDNS 110 using the ping test or trace route may be impossible due to a network configuration between the POP 130 and the LDNS 110 or for other reasons.

In this case, it is difficult to determine the optimal POP 130 or content server 140 which will provide content requested by the client 100 in the CDN.

Accordingly, a method of determining an arbitrary content server 140 by an operator or the like is used. This causes problems such as deterioration of CDM service quality.

To solve such a problem, the present invention provides a method which can be applied when the probe server 150 cannot calculate the distance between the POP 130 and the LDNS 110.

The CDN configuration to which the present invention is applied is the same as the conventional one.

However, the functions of the name server 120 and the probe server 150 are changed in order to calculate the distance between the LDNS 110 and the POP 130.

Upon reception of a DNS resolution request from the LDNS 110, the name server 120 generates a DNS reply representing that the domain name corresponding to the DNS resolution request has been canonically named by affixing an identifier to the domain name and transmits the DNS reply to the probe server 150.

That is, the name server 120 attaches an identifier to the domain name corresponding to the DNS resolution request from the LDNS 110 and delivers the same to the probe server 150.

Upon reception of the DNS reply, the probe server 150 delivers the DNS reply to the LDNS 110.

Here, since the LNDS 110 needs to receive the DNS reply from the name server 120, the probe server 150 changes the IP address of a device generating the DNS reply, that is, the source IP address, to the IP address of the name server 120 and delivers the IP address of the name server 120 to the LDNS 110.

Upon reception of the DNS reply, the LDNS 110 transmits a DNS resolution request to the name server 120 again since the DNS reply represents that the domain name has been canonically named.

For example, when the name server 120 receives a DNS resolution request for foo.cdngp.net from the LDNS 110, the name server 120 generates a DNS reply representing that the domain name is canonically named to id1.foo.cdngp.net and transmits the DNS reply to the probe server 150.

Then, the probe server 150 changes the source IP address to the IP address of the name server 120 and transmits the IP address of the name server 120 to the LDNS 110. Upon reception of the IP address of the name server 120, the LDNS 110 sends a DNS resolution request for id1.foo.cdngp.net, that is, a canonical name (CNAME) resolution request to the name server 120.

A description will be given of a method for calculating the distance between the POP 130 and the LDNS 110 in the aforementioned procedure.

FIG. 2 illustrates a process for implementing the method for calculating the distance between the LDNS 110 and the POP 130 according to an embodiment of the present invention.

Referring to FIG. 2, a DNS resolution request transmitted from the LDNS 110 (S200) is sequentially delivered to the name server 120, the probe server 150 (S210), the LDNS 110 (S220) and the name server 120 (S230).

In this procedure, calculation of the distance between the POP 130 and the LDNS 110 according to the present invention can be performed by the name server 120 or the probe server 150.

More specifically, a method according to a first embodiment calculates the distance between the POP 130 and the LDNS 110 by the name server 120 without receiving additional information.

Since the LDNS 110 transmits the DNS resolution request to the name server 120, the distance between the LDNS 110 and the name server 120 can be correctly calculated and known.

That is, the distance between the LDNS 110 and the name server 120 can be calculated through a conventional network distance calculation method such as the ping test or trace route.

Even if the distance between the LDNS 110 and the name server 120 cannot be calculated, a route between the LDNS 110 and the name server 120 is fixed and determined and thus the distance therebetween is mostly set to a specific value.

When the distance between the LDNS 110 and the name server 120 cannot be calculated, the name server 120 can generate a DNS reply, which represents that the corresponding domain name has been canonically named, for the DNS resolution request received from the LDNS 110, transmit the DNS reply to the LDNS 110 and, when the LDNS 110 sends a CNAME resolution request to the name server 120, calculate the distance between the LDNS 110 and the name server 120 by using an interval between the time when the name server 120 transmits the DNS reply representing that the corresponding domain has been canonically named to the LDNS 110 and the time when the LDNS 110 sends the CNAME resolution request to the name server 120.

The distance between the LDNS 110 and the name server 120 can be calculated through various methods other than the aforementioned method and the method for calculating the distance between the LDNS 110 and the name server 120 is not limited.

Since the distance between the name server 120 and the probe server 150 is a distance between devices constituting the CDN, the distance can be correctly calculated or set to a specific value, like the distance between the LDNS 110 and the name server 120.

Particularly, the distance between the name server 120 and the probe server 150 can be calculated through the ping test or trace route by the name server 120 since the distance between the name server 120 and the probe server 150 is a distance between devices constituting the CDN, differently from the distance between the LDNS 110 and the name server 120. In addition, the distance between the name server 120 and the probe server 150 can be correctly calculated since there is a high possibility that the network between the name server 120 and the probe server 150 is a dedicated network only used in the CDN rather than a public network and thus the distance between the name server 120 and the probe server 150 is fixed.

The method for calculating the distance between the name server 120 and the probe server 150 is not limited and the conventional ping test, trace route and various other methods can be used.

In the first embodiment, the distance between the LDNS 110 and the POP 130 is calculated by subtracting the distance between the name server 120 and the LDNS 110 and the distance between the name server 120 and the probe server 150 from the interval between the time when the name server 120 transmits the DNS reply to the probe server 150 and the time when the name server 120 receives the DNS resolution request for CNAME from the LDNS 110.

While the first embodiment may generate an error corresponding to a difference between processing time in the probe server 150 to change the source IP address and processing time in the LDNS 110, the difference may be insignificant considering the performance of recent network devices.

According to a second embodiment, the name server 120 can calculate the distance between the POP 130 and the LDNS 110 by receiving information about the time when the DNS reply is transmitted to the LDNS 110 from the probe server 150.

That is, the distance between the LDNS 110 and the POP 130 is calculated by subtracting the distance between the name server 120 and the LDNS 110 from the interval between the time when the probe server 150 transmits the DNS reply to the LDNS 110 and the time when the name server 120 receives the DNS resolution request for CNAME.

In the case of the second embodiment, since the probe server 150 performs a processing procedure such as changing the source IP address to the IP address of the name server 120 and thus an error corresponding to processing time in the probe server 150 is not generated. However, information about the time when the probe server 150 transmits the DNS reply to the name server 120 needs to be transmitted and synchronization between the domain name server 120 and the probe server 150 must be achieved.

A third embodiment enables the probe server 150 to calculate the distance between the LDNS 110 and the POP 130.

Though the third embodiment has the advantage that an additional function need not be added to the name server 120, the probe server 150 needs to receive, from the name server 120, information about the time when the name server 120 receives the DNS resolution request for CNAME from the LDNS 110, and synchronization between the name server 110 and the probe server 150 is required.

While synchronization may be performed even in the first embodiment, the distance between the POP 130 and the LDNS 110 is calculated by the name server 120 on the basis of only time information and thus synchronization is not necessarily needed in the first embodiment.

In the second and third embodiments, however, the distance between the POP 130 and the LDNS 110 can be calculated only when synchronization between the name server 110 and the probe server 150 is achieved since the name server 120 or the probe server 150 receives time information from the probe server 150 or the name server 120 and calculates the distance between the POP 130 and the LDNS 110 on the basis of the time information.

Accordingly, the first embodiment which does not require additional data transmission and does not necessarily need synchronization may be more desirable. However, the present invention is not limited thereto.

A description will be given of a case in which the distance between the POP 130 and the LDNS 110 is calculated according to each embodiment.

FIG. 3 is a flowchart illustrating the method for calculating the distance between the LDNS 110 and the POP 130 according to the first embodiment of the present invention.

Referring to FIG. 3, in the method for calculating the distance between the LDNS 110 and the POP 130 according to the first embodiment of the present invention, upon reception of a DNS resolution request from the LDNS 110 (S300), the name server 120 attaches an identifier to the domain name corresponding to the DNS resolution request so as to generate a DNS reply representing that the corresponding domain name has been canonically named (S302) and delivers the DNS reply to the probe server 150 (S304).

The probe server 150 changes the source IP address to the IP address of the name server 120 (S306) and transmits the IP address to the LDNS 110 (S308).

The LDNS 110 sends a DNS resolution request to the name server 120 again since the DNS reply represents that the corresponding domain name has been canonically named (S310).

The name server 120 calculates the distance between the LDNS 110 and the POP 130 by subtracting the distance between the name server 120 and the LDNS 110 and the distance between the name server 120 and the probe server 150 from the interval between the time when the DNS reply is transmitted from the name server 120 to the probe server 150 and the time when the name server 120 receives the DNS resolution request for CNAME from the LDNS 110 (S312).

A description will be given of the method for calculating the distance between the LDNS 110 and the POP 130 according to the second embodiment of the present invention.

FIG. 4 is a flowchart illustrating the method for calculating the distance between the LDNS 110 and the POP 130 according to the second embodiment of the present invention.

As shown in FIG. 4, steps 400 to 410 correspond to steps 300 to 310 of FIG. 3.

Prior to calculation of the distance between the LDNS 110 and the POP 130, the name server 120 further receives, from the probe server 150, information about the time when the DNS reply is transmitted to the LDNS 110 (S412).

Then, the name server 120 calculates the distance between the LDNS 110 and the POP 130 by subtracting the distance between the name server 120 and the LDNS 110 from the interval between the time when the DNS reply is transmitted from the probe server 150 to the LDNS 110 and the time when the name server 120 receives the DNS resolution request for CNAME from the LDNS 110 (S414).

Configurations of the name server 120 and the probe server 150 according to the first and second embodiments will now be described with reference to FIGS. 5 and 6.

FIG. 5 illustrates the configuration of the name server 120 according to the first and second embodiments of the present invention.

Referring to FIG. 5, the name server 120 according to the first and second embodiments of the present invention includes a domain name resolution unit 500, a CNAME generation unit 510, a network state detection unit 520, a distance calculation unit 530 and a communication unit 540.

The domain name resolution unit 500 finds an IP address matched to a corresponding domain with reference to a DNS lookup table (not shown) for the DNS resolution request received from the LDNS 110 and replies to the DNS resolution request with the IP address.

The CNAME generation unit 510 adds an identifier to a domain name included in the DNS resolution request received from the LDNS 110 so as to generate a DNS reply representing that the domain name has been canonically named.

The network state detection unit 520 calculates distances between the name server 120 and the LDNS 110 and devices connected to the name server 120, such as the probe server 150, using the ping test, trace route or the like.

The distance calculation unit 530 calculates the distance between the LDNS 110 and the POP 130 by subtracting the distance between the name server 120 and the LDNS 110 and the distance between the name server 120 and the probe server 150 from the interval between the time when the DNS reply is transmitted from the name server 120 to the probe server 150 and the time when the name server 120 receives the DNS resolution request for CNAME from the LDNS 110, as described above, in the first embodiment.

According to the second embodiment, the distance calculation unit 530 further receives information about the time when the DNS reply is transmitted to the LDNS 110 from the probe server 150 and calculates the distance between the LDNS 110 and the POP 130 by subtracting the distance between the name server 120 and the LDNS 110 from the interval between the time when the DNS reply is transmitted from the probe server 150 to the LDNS 110 and the time when the name server 120 receives the DNS resolution request for CNAME.

The communication unit 540 transmits/receives data by being connected to other network devices such as the LDNS 110 and the probe server 150.

The domain name resolution unit 500, the network state detection unit 520 and the communication unit 540 can be included in a conventional name server, and the CNAME generation unit 510 may be included in the domain name resolution unit 500 to execute the corresponding function.

In the second embodiment, since synchronization between the name server 120 and the probe server 150 is needed, the name server 120 may further include a synchronization unit (not shown) for synchronizing the name server 120 and the probe server 150 by transmitting/receiving time information through the communication unit 540.

FIG. 6 illustrates the configuration of the probe server 150 according to the first and second embodiments of the present invention.

As shown in FIG. 6, the probe server 150 according to the first and second embodiments of the present invention includes a network state detection unit 600, a source IP address change unit 610 and a communication unit 620.

The network state detection unit 600 calculates the distance between the LDNS 110 and the POP 130 using the ping test, trace route or the like as in the prior art or calculates the distance the probe server 150 and a device connected to the probe server 150, for example, the name server 120.

The source IP address change unit 610 changes the source IP address to the IP address of the name server 120 when a received DNS reply is transmitted to the LDNS 110 upon reception of the DNS reply representing that the corresponding domain has been canonically named from the name server 120.

When the source IP address change unit 610 changes the source IP address to the IP address of the name server 120, the LDNS 110 recognizes the IP address as a response to the DNS resolution request sent thereby, receives a reply to the DNS resolution request and sends a DNS resolution request for CNAME again to the name server 120.

The communication unit 620 communicates with devices connected to the probe server 150, such as the LDNS 110 and the name server 120.

In the second embodiment, since synchronization between the name server 120 and the probe server 150 is needed, the probe server 150 may further include a synchronization unit (not shown) for synchronizing the name server 120 and the probe server 150 by transmitting/receiving time information to/from the name server 120 through the communication unit 620.

A description will be given of the third embodiment in which the probe server 150 calculates the distance between the LDNS 110 and the POP 130.

FIG. 7 is a flowchart illustrating the method for calculating the distance between the LDNS 110 and the POP 130 according to the third embodiment of the present invention.

Referring to FIG. 7, steps 700 to 710 are the same as the corresponding steps of FIGS. 3 and 4.

Since the probe server 150 calculates the distance between the LDNS 110 and the POP 130, the name server 120 transmits, to the probe server 150, information on the time when the name server 120 receives a CNAME resolution request from the LDNS 110 and information on the distance between the LDNS 110 and the name server 120 (S712).

Then, the probe server 150 calculates the distance between the LDNS 110 and the POP 130 by subtracting the distance between the name server 120 and the LDNS 110 and the distance between the name server 120 and the probe server 150 from the interval between the time when the probe server 150 transmits the DNS reply representing that the corresponding domain has been canonically named to the LDNS 110 and the time when the CNAME resolution request is received from the name server 120 (S714).

Configurations of the name server 120 and the probe server 150 according to the third embodiment will now be described with reference to FIGS. 8 and 9.

FIG. 8 illustrates the configuration of the name server 120 according to the third embodiment of the present invention.

Referring to FIG. 8, the name server 120 according to the third embodiment of the present invention includes a domain name resolution unit 800, a CNAME generation unit 810, a network state detection unit 820 and a communication unit 830.

The functions of the components of the name server 120 are the same as those in the first and second embodiments.

However, since the probe server 150 calculates the distance between the LDNS 110 and the POP 130 in the third embodiment, the name server 120 does not include the distance calculation unit, distinguished from the first and second embodiments, and information on the distance between the name server 120 and the LDNS 110, calculated by the network state detection unit 820, and information on the time when the name server 120 receives the CNAME resolution request from the LDNS 110 are transmitted to the probe server 150 through the communication unit 830.

FIG. 9 illustrates the configuration of the probe server 150 according to the third embodiment of the present invention.

As shown in FIG. 9, the probe server 150 according to the third embodiment of the present invention includes a distance calculation unit 900, a network state detection unit 910, a source IP address change unit 920 and a communication unit 930.

Since the probe server 150 calculates the distance between the LDNS 110 and the POP 130 in the third embodiment, the distance calculation unit, which is included in the name server 120 in the first and second embodiments, is included in the probe server 150.

The network state detection unit 910, the source IP address change unit 920 and the communication unit 930 execute the same functions as in the first and second embodiments.

However, the communication unit 930 further receives, from the name server 120, information on the distance between the name server 120 and the LDNS 110 and information on the time when the name server 120 receives the CNAME resolution request from the LDNS 110.

The distance calculation unit 900 calculates the distance between the LDNS 110 and the POP 130 by subtracting the distance between the name server 120 and the LDNS 110 and the distance between the name server 120 and the probe server 150 from the interval between the time when the probe server 150 transmits the DNS reply to the LNDS 110 and the time when the name server 120 receives the CNAME resolution request from the LDNS 110.

The distance calculation methods in the CDN according to the present invention may be selectively used only when the distance between the POP 130 and the LDNS 110 cannot be calculated by the probe server 150 through the ping test, trace route or the like.

That is, for a specific POP from among a plurality of POPs, when the distance between the specific POP and the LDNS 110 cannot be calculated through the ping test, trace route or the like, distances between the LDNS 110 and other POPs are calculated through the ping test, trace route or the like and only the distance between the specific POP and the LDNS 110 is calculated through the distance calculation method according to the present invention.

In addition, the optimal POP, for example, the POP closest to the LDNS, is selected in consideration of the distances between the POPs and the LDNS.

It is apparent that the methods for calculating the distance between the LDNS and the POP in the CDN according to the present invention are implemented in the form of a program.

According to the distance calculation methods in the CDN according to the present invention, the distance between the LDNS and the POP is calculated even when the distance cannot be calculated so as to enable improvement of CDN service quality and stabilization of CDN service.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims.

The invention claimed is:

1. A method for calculating, by a name server, a distance between a local DNS (LDNS) and a point of presence (POP) in a content delivery network (CDN) including a client, the LDNS, the name server, the POP, and a probe server included in the POP, the method comprising:
   responsive to the name server receiving a domain name resolution request from the LDNS, generating, by the name server, a canonically named (CNAME) domain name reply by adding an identifier to a resolution-requested domain name corresponding to the domain name resolution request; and
   transmitting, by the name server, the CNAME domain name reply to the probe server,
   wherein a source IP address corresponding to the CNAME domain name reply transmitted to the probe server is changed to the address of the name server by the probe server and delivered to the LDNS,
   wherein the name server receives a resolution request for the CNAME domain name reply from the LDNS,
   wherein the name server calculates a time based distance between the LDNS and the POP by subtracting a time based distance between the name server and the LDNS and a time based distance between the name server and the probe server from a total time from when the CNAME domain name reply is transmitted from the name server to the probe server to when the name server receives the resolution request for the CNAME domain name reply from the LDNS.

2. A method for calculating, by a name server, a distance between a local DNS (LDNS) and a point of presence (POP) in a content delivery network (CDN) including a client, the LDNS, the name server, the POP, and a probe server included in the POP, the method comprising:
   responsive to the name server receiving a domain name resolution request from the LDNS, generating, by the name server, a CNAME domain name reply by adding an identifier to a resolution-requested domain name corresponding to the domain name resolution request; and
   transmitting, by the name server, the CNAME domain name reply to the probe server,
   wherein a source IP address corresponding to the CNAME domain name reply transmitted to the probe server is changed to the address of the name server by the probe server and delivered to the LDNS,
   wherein the name server receives a resolution request for the CNAME domain name reply from the LDNS,
   wherein the name server receives information about a time when the CNAME domain name reply is transmitted from the probe server to the LDNS and the name server calculates a time based distance between the LDNS and the POP by subtracting a time based distance between the name server and the LDNS from a total time that is based on the time when the CNAME domain name reply is transmitted from the probe server to the LDNS and a time when the name server receives the resolution request for the CNAME domain name reply from the LDNS.

3. A method for calculating, by a probe server, a distance between a local DNS (LDNS) and a point of presence (POP) in a content delivery network (CDN) including a client, the LDNS, a name server, the POP, and the probe server included in the POP, the method comprising:

receiving by the probe server, a CNAME domain name reply from the name server, the CNAME domain reply generated by receiving a domain name resolution request from the LDNS and adding an identifier to a resolution-requested domain name corresponding to the domain name resolution request;

changing, by the probe server, a source IP address corresponding to the received CNAME domain name reply to the address of the name server and transmitting the address of the name server to the LDNS;

receiving, by the probe server, information about a time when the name server receives a resolution request for the CNAME domain name reply from the LDNS and information about a time based distance between the name server and the LDNS from the name server; and calculating, by the probe server, a time based distance between the LDNS and the POP by subtracting the time based distance between the name server and the LDNS from a total time that is based on the time when the CNAME domain name reply is transmitted to the LDNS and a time when the resolution request for the CNAME domain name reply from the LDNS is received from the name server.

4. The method according to one of claims 1, 2 and 3, wherein the probe server is installed in the POP in the form of a program.

5. The method according to one of claims 1, 2 and 3, wherein the time based distance between the name server and the LDNS is calculated through at least one of a ping test and trace route.

6. The method according to one of claims 1, 2 and 3, wherein the time based distance between the name server and the LDNS is calculated using a time for which the name server generates the CNAME domain name reply for the resolution-requested domain name upon receiving the domain name resolution request from the LDNS, transmits the CNAME domain name reply to the LDNS and receives the CNAME resolution request from the LDNS.

7. The method according to one of claims 2 and 3, wherein the name server and the probe server are synchronized with each other.

8. The method according to one of claims 1, 2 and 3, wherein the calculating of the time based distance between the LDNS and the POP is applied only when the probe server cannot directly calculate the time based distance between the LDNS and the POP.

9. The method according to claim 8, wherein the probe server directly calculates the time based distance between the LDNS and the POP using at least one of the ping test and trace route.

10. A name server for calculating a distance between a local DNS (LDNS) and a point of presence (POPS) in a content delivery network (CDN) including a client, the LDNS, a name server, the POP, and a probe server included in the POP, the name server comprising:
a domain name resolution unit for transmitting, to the LDNS, an IP address matched to a domain name corresponding to a domain name resolution request responsive to the domain name resolution request being received from the LDNS;
a CNAME generation unit for generating a CNAME domain name reply by adding an identifier to the resolution-requested domain name;
a network state detection unit for calculating a time based distance between the LDNS and the name server;
a distance calculation unit for calculating a time based distance between the LDNS and the POP; and a communication unit for receiving the domain name resolution request from the LDNS, transmitting the CNAME domain name reply to the probe server and receiving a domain name resolution request from the LDNS,
wherein a source IP address corresponding to the CNAME domain name reply transmitted to the probe server through the communication unit is changed to the address of the name server by the probe server and delivered to the LDNS,
wherein a resolution request for the CNAME domain name reply is received from the LDNS through the communication unit,
wherein the distance calculation unit calculates the time based distance between the LDNS and the POP by subtracting a time based distance between the name server and the LDNS and a time based distance between the name server and the probe server from a total time from when the CNAME domain name reply is transmitted from the name server to the probe server to when the name server receives the resolution request for the CNAME domain name reply from the LDNS.

11. A name server for calculating a distance between a local DNS LDNS and a point of presence (POPS) in a content delivery network (CDN) including a client, the LDNS, a name server, the POP, and a probe server included in the POP, the name server comprising:
a domain name resolution unit for transmitting, to the LDNS, an IP address matched to a domain name corresponding to a domain name resolution request responsive to the domain name resolution request being received from the LDNS;
a CNAME generation unit for generating a CNAME domain name reply by adding an identifier to the resolution-requested domain name;
a network state detection unit for calculating a time based distance between the LDNS and the name server;
a distance calculation unit for calculating a time based distance between the LDNS and the POP; and
a communication unit for receiving the domain name resolution request from the LDNS, transmitting the CNAME domain name reply to the probe server and receiving a domain name resolution request from the LDNS,
wherein a source IP address corresponding to the CNAME domain name reply transmitted to the probe server through the communication unit is changed to the address of the name server by the probe server and delivered to the LDNS,
wherein a resolution request for the CNAME domain name reply is received from the LDNS through the communication unit, and information about a time when the CNAME domain name reply is transmitted from the probe server to the LDNS is received,
wherein the distance calculation unit calculates the time based distance between the LDNS and the POP by subtracting a time distance between the name server and the LDNS from a total time that is based on the time when the CNAME domain name reply is transmitted from the probe server to the LDNS and a time when the name server receives the resolution request for the CNAME domain name reply from the LDNS.

12. A probe server for calculating a distance between a local DNS (LDNS) and a point of presence (POP) in a content delivery network (CDN) including a client, the LDNS, a name server, the POP, and the probe server included in the POP, the probe server comprising:

a network state detection unit for calculating a time based distance between the probe server and the name server;

a source IP address change unit for changing a source IP address to the IP address of the name server when a CNAME domain name reply received from the name server is delivered to the LDNS, wherein the CNAME domain name reply received from the name server is generated by the name server by receiving a domain name resolution request from the LDNS and adding an identifier to a resolution-requested domain name corresponding to the domain name resolution request;

a distance calculation unit for calculating a time based distance between the LDNS and the POP; and a communication unit for receiving a resolution request for the CNAME domain name reply from the name server, transmitting, to the LDNS, the CNAME domain name reply, for which the source IP address is changed by the source IP address change unit, and receiving, from the name server, information about a time when the resolution request for the CNAME domain name reply is received from the LDNS and information about a time based distance between the name server and the LDNS, wherein the distance calculation unit calculates the time based distance between the LDNS and the POP by subtracting the time based distance between the name server and the LDNS from a total time that is based on the time when the CNAME domain name reply is transmitted to the LDNS and a time when the resolution request for the CNAME domain name reply from the LDNS is received from the name server.

13. The apparatus according to one of claims 10, 11 and 12, wherein the probe server is installed in the POP in the form of a program.

14. The apparatus according to one of claims 10, 11 and 12, wherein the network state detection unit calculates the time based distance between the name server and the LDNS through at least one of a ping test and trace route.

15. The apparatus according to one of claims 10 and 11, wherein the network state detection unit calculates the time based distance between the name server and the LDNS using a time for which the name server generates the CNAME domain name reply for the resolution-requested domain name when receiving the domain name resolution request from the LDNS, transmits the CNAME domain name reply to the LDNS and receives the CNAME resolution request from the LDNS.

16. The apparatus according to one of claim 12, wherein the information about the time based distance between the name server and the LDNS, received by the name server, is information calculated by the name server using at least one of a ping test and trace route.

17. The apparatus according to one of claim 12, wherein the information about the time based distance between the name server and the LDNS, received by the name server, is information calculated using a time for which the name server generates the CNAME domain name reply indicating that the resolution-requested domain name has been canonically named when receiving the domain name resolution request from the LDNS, transmits the CNAME domain mane reply to the LDNS and receives the CNAME resolution request from the LDNS.

18. The apparatus according to one of claims 11 and 12, wherein the name server and the probe server are synchronized with each other.

19. The apparatus according to one of claims 10 and 11, wherein the distance calculation unit of the name server calculates the time based distance between the LDNS and the POP only when the probe server cannot directly calculate the time based distance between the LDNS and the POP.

20. The apparatus according to claim 12, wherein the distance calculation unit of the probe server calculates the time based distance between the LDNS and the POP only when the probe server cannot directly calculate the time based distance between the LDNS and the POP.

21. The apparatus according to one of claim 20, wherein the probe server directly calculates the time based distance between the LDNS and the POP using at least one of a ping test and trace route.

22. A non-transitory recording medium storing a program for implementing a method for calculating, by a name server, a distance between a local DNS (LDNS) and a point of presence/POP) in a CDN including a client, the LDNS, the name server, the POP, and a probe server included in the POP, the method comprising:

responsive to the name server receiving a domain name resolution request from the LDNS, generating, by the name server, a canonically named (CNAME) domain name reply by adding an identifier to a resolution-requested domain name corresponding to the domain name resolution request; and transmitting, by the name server, the CNAME domain name reply to the probe server, wherein a source IP address corresponding to the CNAME domain name reply transmitted to the probe server is changed to the address of the name server by the probe server and delivered to the LDNS, wherein the name server receives a resolution request for the CNAME domain name reply from the LDNS, wherein the name server calculates a time based distance between the LDNS and the POP by subtracting a time based distance between the name server and the LDNS and a time based distance between the name server and the probe server from a total time from when the CNAME domain name reply is transmitted from the name server to the probe server to when the name server receives the resolution request for the CNAME domain name reply from the LDNS.

23. A non-transitory recording medium storing a program for implementing a method for calculating, by a name server, a distance between a local DNS (LDNS) and a point of presence/POP) in a content delivery network/CDN) including a client, the LDNS, the name server, the POP, and a probe server included in the POP, the method comprising:

responsive to the name server receiving a domain name resolution request from the LDNS, generating, by the name server, a CNAME domain name reply by adding an identifier to a resolution-requested domain name corresponding to the domain name resolution request; and transmitting, by the name server, the CNAME domain name reply to the probe server, wherein a source IP address corresponding to the CNAME domain name reply transmitted to the probe server is changed to the address of the name server by the probe server and delivered to the LDNS, wherein the name server receives a resolution request for the CNAME domain name reply from the LDNS, wherein the name server receives information about a time when the CNAME domain name reply is transmitted from the probe server to the LDNS and the name server calculates a time based distance between the LDNS and the POP by subtracting a time based distance between the name server and the LDNS from a total time that is based on the time when the CNAME domain name reply is transmitted from the probe server to the LDNS and a time when the name server receives the resolution request for the CNAME domain name reply from the LDNS.

24. A non-transitory recording medium storing a program for implementing a method for calculating, by a probe server, a distance between a local DNS (LDNS) and a point of presence (POP) in a content delivery network (CDN) including a client, the LDNS, a name server, the POP, and the probe server included in the POP, the method comprising:

receiving by the probe server, a CNAME domain name reply from the name server, the CNAME domain reply generated by receiving a domain name resolution request from the LDNS and adding an identifier to a resolution-requested domain name corresponding to the domain name resolution request;

changing, by the probe server, a source IP address corresponding to the received CNAME domain name reply to the address of the name server and transmitting the address of the name server to the LDNS;

receiving, by the probe server, information about a time when the name server receives a resolution request for the CNAME domain name reply from the LDNS and information about a time based distance between the name server and the LDNS from the name server; and calculating, by the probe server, a time based distance between the LDNS and the POP by subtracting the time based distance between the name server and the LDNS from a total time that is based on the time when the CNAME domain name reply is transmitted to the LDNS and a time when the resolution request for the CNAME domain name reply from the LDNS is received from the name server.

* * * * *

UNITED STATES PATENT AND TRADEMARK OFFICE
CERTIFICATE OF CORRECTION

PATENT NO. : 10,243,917 B2  
APPLICATION NO. : 14/783746  
DATED : March 26, 2019  
INVENTOR(S) : Yong-Bae Kim, Seung-Ho Ryu and Seok Chan Lee Page 1 of 1

It is certified that error appears in the above-identified patent and that said Letters Patent is hereby corrected as shown below:

In the Claims

Column 19, Line 52, Claim 10, delete "(POPS)" and insert --(POP)--  
Column 21, Line 48, Claim 16, after "according to", delete "one of"  
Column 21, Line 53, Claim 17, after "according to", delete "one of"  
Column 22, Line 9, Claim 21, after "according to", delete "one of"  
Column 22, Line 16, Claim 22, delete "presence/POP)" and insert --presence (POP)--  
Column 22, Line 45, Claim 23, delete "presence/POP)" and insert --presence (POP)--  
Column 22, Line 45, Claim 23, delete "network/CDN)" and insert --network (CDN)--

Signed and Sealed this  
Tenth Day of September, 2019

Andrei Iancu  
*Director of the United States Patent and Trademark Office*